United States Patent [19]
Ogura

[11] Patent Number: 5,883,674
[45] Date of Patent: Mar. 16, 1999

[54] METHOD AND APPARATUS FOR SETTING A SEARCH RANGE FOR DETECTING MOTION VECTORS UTILIZED FOR ENCODING PICTURE DATA

[75] Inventor: Eiji Ogura, Saitama, Japan

[73] Assignee: Sony Corporation, Tokyo, Japan

[21] Appl. No.: 698,088

[22] Filed: Aug. 15, 1996

[30] Foreign Application Priority Data

Aug. 16, 1995 [JP] Japan ................................. 7-208743

[51] Int. Cl.[6] ........................................... H04N 7/12
[52] U.S. Cl. ........................ 348/416; 348/699; 348/413
[58] Field of Search .................................. 348/400, 416, 348/413, 699; H04N 7/12

[56] References Cited

U.S. PATENT DOCUMENTS

| | | | |
|---|---|---|---|
| 5,016,102 | 5/1991 | Avis | 348/416 |
| 5,021,891 | 6/1991 | Lee | 358/432 |
| 5,107,345 | 4/1992 | Lee | 358/432 |
| 5,231,484 | 7/1993 | Gonzales et al. | 348/400 |
| 5,317,397 | 5/1994 | Odaka et al. | 348/416 |
| 5,473,379 | 12/1995 | Horne | 348/416 |
| 5,546,129 | 8/1996 | Lee | 348/416 |
| 5,576,767 | 11/1996 | Lee et al. | 348/416 |
| 5,602,593 | 2/1997 | Katto | 348/416 |
| 5,604,546 | 2/1997 | Iwata | 348/416 |

*Primary Examiner*—Brian L. Casler
*Assistant Examiner*—LuAnne P. Din
*Attorney, Agent, or Firm*—Frommer Lawrence & Haug, LLP.; William S. Frommer; Dennis M. Smid

[57] ABSTRACT

An apparatus and method for encoding picture data. A motion vector is detected and a distribution range of the detected motion vector is determined. Based upon such distribution range, a motion vector search range is predicted and set. Detection for the next motion vector is performed within the set search range. The picture data and/or motion vectors are variable length encoded, wherein codes having relatively short lengths may be utilized. As a result, the amount of information generated during such encoding may be relatively small. Upon reproduction of such encoded data, a picture having relatively high quality may be produced.

20 Claims, 8 Drawing Sheets

METHOD AND APPARATUS FOR SETTING A SEARCH RANGE FOR DETECTING MOTION VECTORS UTILIZED FOR ENCODING PICTURE DATA

BACKGROUND OF THE INVENTION

The present invention relates to a technique for motion compensating video picture data, encoding the motion compensated video picture data and recording such encoded video picture data.

A high-efficiency encoding system may conform to a Moving Picture Imaging Coding Experts Group (MPEG) standard. This MPEG system may be derived from an international standard prescriptions known as a video code for audiovisual services at px64 kbit/s Recommendation H.261 of ITU-T (International Telecommunication Union-Telecommunication Standardization Sector). The MPEG system may have a storage medium, such as a CD-ROM or the like, and may utilize motion compensation prediction for inter-frame prediction and discrete cosine transform (DCT) as an orthogonal transformation.

Figure 8:
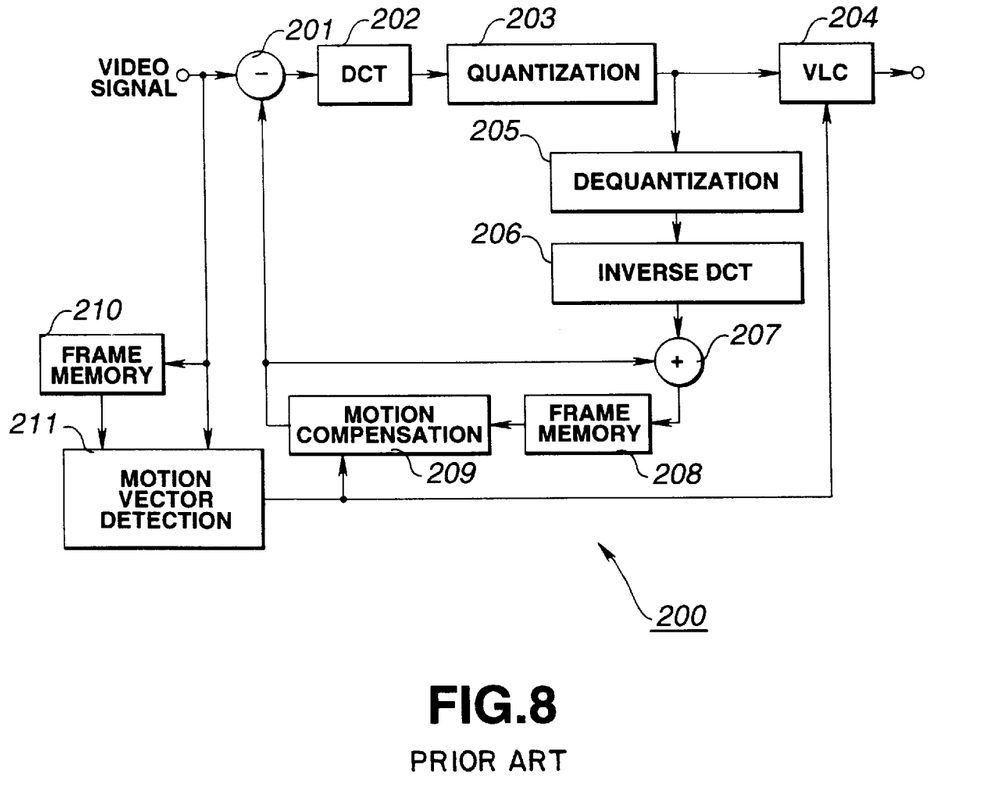
FIG. 8 is a diagram to which reference will be made in explaining a picture encoding apparatus in the Background of the Invention.

FIG. 8 illustrates a picture encoding device 200 which utilizes the above-mentioned MPEG system. As shown therein, such picture encoding device 200 generally includes a subtraction circuit 201, a DCT circuit 202, a quantization circuit 203, a variable length encoding circuit 204, a dequantization circuit 205, an inverse DCT circuit 206, an addition circuit 207, frame memories 208 and 210, a motion compensation circuit 209, and a motion vector detection circuit 211.

Video signals, which may represent blocks of pixels having a predetermined size (for example, 16×16 pixel blocks) which are obtained or divided from a current standard frame, may be supplied to an input terminal of the picture encoding device 200. Such video signals may be supplied therefrom as reference frame data to the frame memory 210, the motion vector detection circuit 211 and one input of the subtraction circuit 201.

The frame memory 210 may store the reference frame data received from the input terminal. The motion vector detection circuit 211 detects or determines motion vector(s) by reading out previous frame data stored in the frame memory 210, using such read frame data as a so-called search frame, and determining/detecting which blocks or positions of blocks of the search frame correspond to each block of a received reference frame. During such motion vector detection processing, a motion vector detection or search range may be utilized which has a pre-set size. The motion vector obtained by the motion vector detection circuit 211 is supplied to the motion compensation circuit 209 and the variable length encoding circuit 204.

In addition to the reference frame data from the input terminal, the subtraction circuit 201 receives motion compensated frame data from the motion compensation circuit 209. The subtraction circuit 201 subtracts the received data so as to obtain the difference between the reference frame data and the motion compensated frame data. The difference data is supplied to the DCT circuit 202, wherein discrete cosine transform processing is performed. An output signal from the DCT circuit 202 is supplied to the quantization circuit 203, wherein the received data is quantized in a predetermined manner. The quantized data from the quantization circuit 203 is supplied to the variable length encoding circuit 204. Simultaneously, the motion vector from the motion vector detection circuit 211 is also supplied to the variable length encoding circuit 204, as previously described. The variable length encoding circuit 204 encodes the received signals with variable length codes and supplies the encoded data to an output terminal.

The quantized data from the quantization circuit 203 is further supplied to the dequantization circuit 205, wherein processing substantially opposite to that performed by the quantization circuit 203 is performed. An output from the dequantization circuit 205 is supplied to the inverse DCT circuit 206, wherein processing substantially opposite to that performed by the DCT circuit 202 is performed so as to obtain the current frame data. Such current frame data is supplied to one input of the addition circuit 207 and the motion compensated frame data from the motion compensation circuit 209 is supplied to another input of the addition circuit. The addition circuit 207 adds or combines the received signals and supplies an added output signal to the frame memory 208, whereupon such output signal may be stored therein.

The motion compensation circuit 209 receives the motion vector detected by the motion vector detection circuit 211 and reads previously stored frame data from the frame memory 208. The motion compensation circuit 209 performs motion compensation processing on the received data so as to form motion compensated frame data which is supplied to the subtraction circuit 201 and the addition circuit 207, as previously described.

With regard to the processing or coding performed by the variable length encoding circuit 204, the length of a variable length code in a table which may be utilized by the variable length encoding circuit 204 may vary with the size of the search range used by the motion vector detection circuit 211. For example, the length or size of the code in the variable length code table may increase as the size of the search range increases. As a result, if the motion vector detection processing is performed utilizing a search range having a constant size, the code length allocated for a motion vector may be larger than needed as, for example, in the situation wherein a moving picture having relatively little motion is being processed. Thus, such processing or encoding may produce a larger amount of information than may be necessary.

Further, if the search range is larger than needed or larger than the actual movement, a motion vector may be erroneously detected which corresponds to a motion larger than the actual motion. In this situation, the length of the code(s) assigned to the erroneously large motion vector is larger than that of the correct motion vector and, as a result, the amount of information produced from encoding this erroneous motion vector is increased.

Furthermore, variable length encoding the difference between the reference frame data and the motion-compensated previous frame data may result in a distribution of motion vectors which is not smooth. As a result, the amount of information produced from encoding the motion vector may be increased.

OBJECTS AND SUMMARY OF THE INVENTION

An object of the present invention is to provide a technique for encoding picture data and/or for recording encoded picture data wherein the amount of information produced during encoding which involves a motion vector is relatively small.

Another object of the present invention is to provide a technique as aforesaid wherein a reproduced picture having relatively high quality may be obtained from the encoded picture data.

In accordance with an aspect of the present invention, a picture encoding method is provided for detecting a motion vector of input video signals representing one frame by utilizing video signals of a previous frame, motion-compensating the video signals of the previous frame based upon the detected motion vector and encoding the motion-compensated video signals. The method comprises the steps of detecting a distribution range of the motion vector of the one-frame input video signals; predicting a search range of the motion vector based upon the detected distribution range and setting the search range; and detecting the motion vector of the input video signals within the set search range.

In accordance with another aspect of the present invention, a picture encoding apparatus is provided which has a motion vector detection device for detecting a motion vector of input video signals representing one frame by utilizing video signals of a previous frame, motion-compensating the video signals of the previous frame based upon the detected motion vector obtained by the motion vector detection device and encoding the motion-compensated video signals. The apparatus comprises a distribution detection device for detecting a distribution range of the motion vector obtained by the motion vector detection device; and a control device for controlling a search range of the motion vector by the motion vector detection device based upon the motion vector distribution range from the distribution detection device. The control means predicts the search range for the motion vectors of the video signals in the motion vector detection device and sets the search range of the motion vector in the motion vector detection device. The motion vector detection device detects the motion vector of the input video signals within the search range set by the control device.

In accordance with another aspect of the present invention, a recording apparatus is provided for recording encoded video data on a recording medium, in which a motion vector of input video signals representing one frame is detected utilizing video signals of a previous frame and the video signals of the previous frame are motion-compensated based upon the detected motion vector and encoded so as to form the encoded video data. The apparatus comprises a motion vector detection device for detecting the motion vector; a distribution detection device for detecting a distribution range of the motion vectors obtained by the motion vector detection device; and a control device for controlling a search range for the motion vectors by the motion vector detection device based upon the motion vector distribution range from the distribution detection device. The control device predicts the search range of the motion vector of the video signals in the motion vector detection device and sets the motion vector search range for the motion vector detection device. The motion vector detection device detects the motion vector of the input video signals within the search range set by the control device.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

Preferred embodiments of the present invention will now be described with reference to the accompanying drawings.

Figure 1:
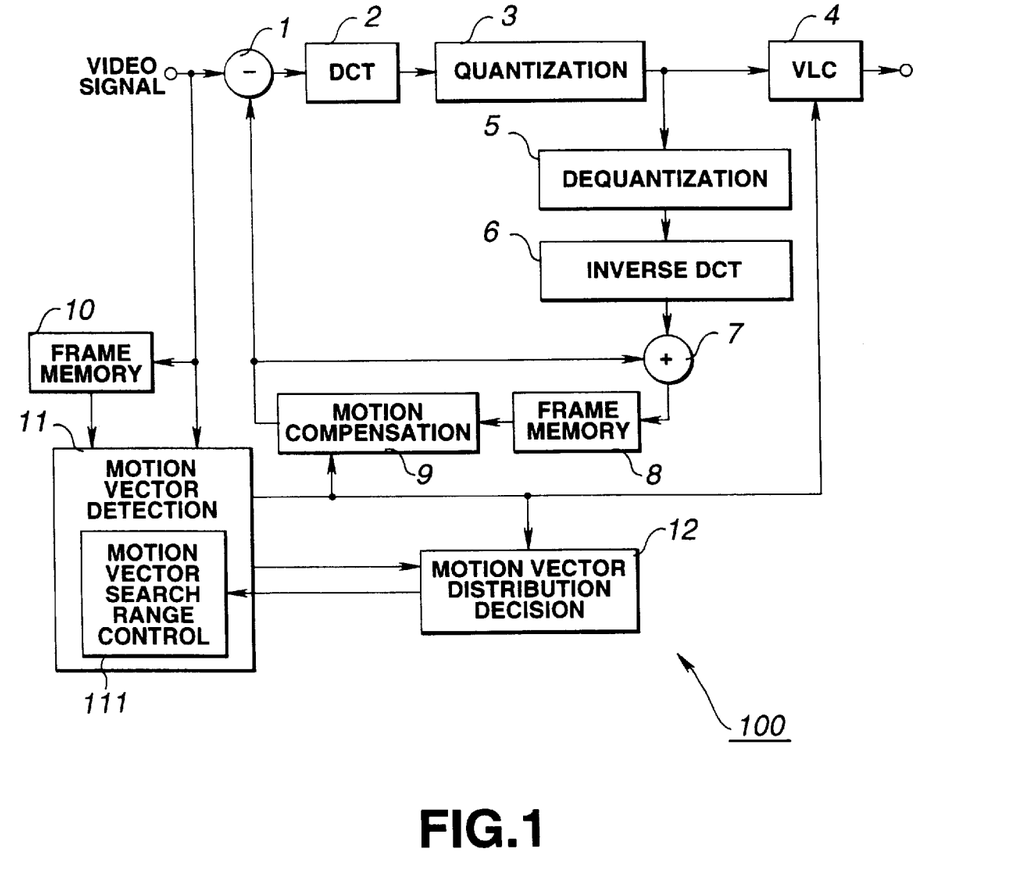
FIG. 1 is a diagram of a picture encoding apparatus according to an embodiment of the present invention.

A picture encoding apparatus 100 is illustrated in FIG. 1. Such apparatus 100 generally includes a subtraction circuit 1, a DCT circuit 2, a quantization circuit 3, a variable length encoding circuit 4, a dequantization circuit 5, an inverse DCT circuit 6, an addition circuit 7, frame memories 8 and 10, a motion compensation circuit 9, a motion vector detection circuit 11, and a motion vector distribution judgment circuit 12, which are connected as shown in FIG. 1.

The subtraction circuit 1 is adapted to receive a video data signal from an input terminal and a motion compensated signal from the motion compensation circuit 9 and to subtract such signals so as to obtain a difference data signal which is supplied to the DCT circuit 2. The DCT circuit 2 is adapted to perform predetermined DCT processing, such as 16×16 pixel two-dimensional DCT processing, on the received data so as to transform the data from a time domain or spatial axis to a frequency domain or axis and produce DCT coefficients. Such DCT coefficients are supplied to the quantization circuit 3 which is adapted to quantize the received coefficients at a predetermined quantization step and to supply the quantized data to the variable length encoding circuit 4. The variable length encoding circuit 4 may also receive an output from the motion vector detection circuit 11. Such encoding circuit is adapted to assign variable length code(s) to the received data and to supply the encoded data to an output terminal.

The quantized data from the quantization circuit 3 is further supplied to the dequantization circuit 5 which performs processing substantially opposite to that performed by the quantization circuit 3. An output from the dequantization circuit 5 is supplied to the inverse DCT circuit 6, wherein processing substantially opposite to that performed by the DCT circuit 2 is performed. An output from the inverse DCT circuit 6 and the motion compensated signal from the motion compensation circuit 9 are supplied to the addition circuit 7, wherein the received signals are added or combined and supplied to the frame memory 8 so as to be stored therein. The frame memory 8 has a predetermined memory capacity which may enable data corresponding to two or more frames to be stored therein. The motion compensation circuit receives an output or a motion vector from the motion vector detection circuit 11 and stored data from the frame memory 8 and performs motion compensation processing on the received data so as to form the motion compensated signal which is supplied to the subtraction circuit 1 and the addition circuit 7 as previously described.

The video data signal received at the input terminal may be further supplied to the motion vector detection circuit 11 and the frame memory 10 so as to be stored therein. The frame memory 10, like the frame memory 8, may have a memory capacity capable of storing two or more frames of data. The motion vector detection circuit 11 includes a motion vector search range control circuit 111.

As hereinafter more fully described, the motion vector detection circuit 11 may receive stored data from the frame is memory 10 and video data from the input terminal and may obtain or detect a motion vector or vectors for the received data signals and supply such motion vector(s) to the motion vector distribution decision circuit 12. The motion vector distribution decision circuit 12 is adapted to determine a distribution range of the received motion vector(s) and to supply an output signal indicative of such distribution range to the motion vector search range control circuit 111. In response to the received distribution range signal, the motion vector search range control circuit 111 is adapted to set a search range for motion vector detection and to control the motion vector detection circuit 11 so as to perform the motion vector detection operation within the search range.

The picture encoding apparatus 100 may utilize a predetermined encoding technique, such as that of a so-called MPG2 system. The MPEG2 system may perform numerous features or may be applicable in numerous situations which may not be available with the above-mentioned MPEG system and, as such, the MPEG2 system may be considered an improved system as compared to the MPEG system. For example, the MPEG2 system may be applied not only to a storage medium but also to a communication or broadcasting medium, the MPEG2 system may be applied to a television system having a relatively high picture quality such as that of a HDTV (high definition television), the MPG2 system may be applied to non-interlaced and interlaced pictures, the MPEG2 system may exhibit scalability (resolution), and frames and/or fields may be assigned to a picture in the MPEG2 system. Further, a MPEG2 decoder may decode MPEG bitstreams, thus providing lower-order compatibility.

In the MPEG2 system, video or picture data may be processed or compressed on a predetermined basis such as a frame basis. In such system, there may be three types of processing or frames (pictures), that is, an intra-coded (I) frame (picture), an inter-frame predictively coded (P) frame (picture) and a bi-directionally predictive coded (B) frame (picture). An I frame is generated by using only data within that respective frame or picture. A P frame may be generated by using data from a temporally preceding and previously decoded I or P picture or frame. A B frame may be generated by using data from a temporally preceding or succeeding and already decoded I or P picture or frame, or a combination thereof. Such frames or pictures may be processed or encoded in a first sequence and rearranged so as to be displayed in a second sequence. For example, the frames or pictures may be displayed in the order of I, B1, B2, P and so forth, and such frames or pictures may be processed in the order of I, P, B1, B2 and so forth. Such difference in sequences is a result of the type of processing performed. As an example, since a B frame may he based on a succeeding I or P frame, such I or P frame is processed before the respective B frame.

Furthermore, the picture encoding apparatus 100 utilizing the MPEG2 system may provide a distance between an I-frame and a P-frame which corresponds to three frames. Such distance may have a B1 frame and a 22 frame between the I-frame and the P-frame as, for example, shown in FIG. 2A.

The operation of the picture encoding apparatus 100 will now be described.

Picture signals are supplied to the picture encoding apparatus 100, whereupon processing or encoding of such received signals is performed in the encoding sequence. That is, the encoding sequence of the received picture signals may be I(1), P(4), B1(2), B2(3), P(7), B1(5), B2(6), P(10), . . . and so forth. (In this arrangement, the number in parenthesis indicates the display frame number.) Accordingly, the picture encoding apparatus 100 first encodes the I(1) frame, then encodes the P(4) frame, thereafter the B1(2) frame and so forth. Such encoding will now be described.

Data of the I(1) frame is supplied through the input terminal of the picture encoding apparatus 100 to the frame memory 10 and stored therein. Such I(1) data is further supplied to one input of the subtraction circuit 1. Since motion compensation is not performed for I frames, the received I(1) frame data passes through the subtraction circuit 1 to the DCT circuit 2. The DCT circuit 2 performs 16×16 pixel two-dimensional DCT processing on the received I(1) frame data which transforms the I(1) frame data from a time domain or spatial axis into a frequency domain or frequency axis and produces DCT coefficients which are supplied to the quantization circuit 3. The quantization circuit 3 quantizes the received DCT coefficients at a predetermined quantization step so as to obtain quantized data which is supplied to the variable length encoding circuit 4 and the dequantization circuit 5. The variable length encoding circuit 4 assigns variable length codes to the received quantized data and supplies the encoded data to the output terminal. The dequantization circuit 5 dequantizes the quantized data received from the quantization circuit 3 at a quantization step corresponding to that utilized in the quantization circuit 3 to restore the data into DCT coefficients which are supplied to the inverse DCT circuit 6. The inverse DCT circuit 6 processes the DCT coefficients in accordance with an inverse DCT so as to transform the DCT coefficients from data in the frequency domain (frequency axis) into data in the time domain (spatial axis). The transformed data from the inverse DCT circuit 6, or current I(1) frame data, is supplied to the frame memory 8 by way of the addition circuit 7 and stored therein.

The P(4) frame, which follows the I(1) frame, is next encoded as described below.

Figures 2A, 2B:
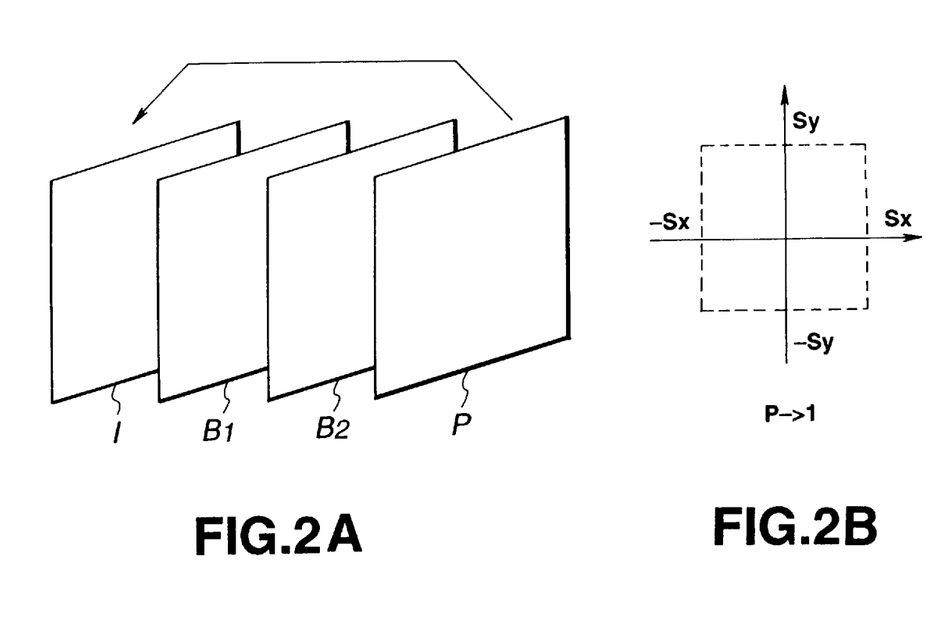
FIGS. 2A and 2B are diagrams to which reference will be made in explaining the operation of the picture encoding apparatus of FIG. 1.

The P(4) frame data is supplied through the input terminal to the frame memory 10 and stored therein. Since two frames of data may be stored within the frame memory 10 as previously described, the P(4) frame data may be stored in the memory 10 along with the previously stored I(1) frame data. The P(4) frame data from the input terminal is further supplied to the motion vector detection circuit 11 as reference frame data. The motion vector detection circuit 11 reads the stored I(1) frame data from the frame memory 10 and utilizes the read data as a search frame. That is, the motion vector detection circuit 11 determines the position of a block of the I(1) frame data which corresponds to a 16×16 pixel reference block of the reference frame data within a predetermined search range, as hereinafter more fully described. FIG. 2A illustrates the relation between the reference frame (P(4)) and the search frame I(1). (The arrow head indicates the search frame I(1).) The determined block position, or motion vector, from the motion vector detection circuit 11 is supplied to the motion compensation circuit 9, the motion vector distribution judgment circuit 12 and the variable length encoding circuit 4.

In accordance with the motion vector received from the motion vector detection circuit 11, the motion compensation circuit 9 reads out stored data of the I(1) frame from the frame memory 8 and performs motion compensation for the I(1) frame. That is, the motion compensation circuit 9 may read out block data from the stored I(1) data which is specified by or corresponds to the motion vector received from the motion vector detection circuit 11 and motion compensates such data. The produced motion-compensated block data from the motion compensation circuit is supplied to the subtraction circuit 1. The subtraction circuit 1 determines the difference between the data of the reference frame (P(4)) and the motion-compensated I(1) frame. Such difference, or inter-block corresponding or matching residual data, is supplied to the DCT circuit 2 and the quantization circuit 3 which process the received data in a manner similar to that previously described.

An output of the quantization circuit 3, that is, the DCT processed and quantized residual data, is decoded by the dequantization circuit 5 and the inverse DCT circuit 6. Such decoded residual data and the motion compensated data of the I(1) frame data from the motion compensation circuit 9 may be simultaneously supplied to the addition circuit 7, wherein such received data is summed or combined so as to restore the data to the current P(4) frame data which is stored in the frame memory 8.

The output of the quantization circuit 3 is further supplied to the variable length encoding circuit 4. The variable length encoding circuit 4 assigns variable length codes to the residual data from the quantization circuit 3 and the motion vector from the motion vector detection circuit 11, as hereinbelow more fully described, and supplies the produced encoded data to the output terminal.

The variable length encoding circuit 4 assigns variable length codes (or converts the received data into codes) in accordance with the values of the differences or the motion vectors from the motion vector detection circuit 11. An example of variable length codes as a function of motion codes is illustrated in Table 1 below.

TABLE 1

| variable length codes | motion codes |
|---|---|
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 111 | −4 |
| 0001 1 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |

TABLE 1-continued

| variable length codes | motion codes |
|---|---|
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

As seen from Table 1, the lengths of the variable length codes assigned to the motion vectors or the difference values vary in accordance with the values thereof. That is, the smaller the values of the motion vectors (motion code), the shorter the code lengths.

Further, in Table 1, the search range of the motion vector values is −16 to +16. If, however, the motion vector value search range is set so as to exceed the range from −16 to +16, the length of the code assigned to the motion vector values may increase. As a result, if the search range is erroneously set so as to be larger than needed or larger than possible values of the motion vectors, the amount of motion vector encoded information may be increased as compared to the situation wherein a proper size search range was utilized.

The above-mentioned search range may be initially set by the search range control circuit 111. Thereafter, search ranges may be determined and set by utilizing the motion vector detection circuit 11, the search range control circuit 111 and the motion vector distribution judgment circuit 12. That is, the motion vector distribution judgment circuit 12 determines the range of distribution of the motion vector values obtained by the motion vector detection circuit 11. Based upon such determined distribution range, the search range control circuit 111 sets a is search range for motion vector detection by the motion vector detection circuit 11 and controls the same so as to detect a motion vector within the search range.

Figure 3:
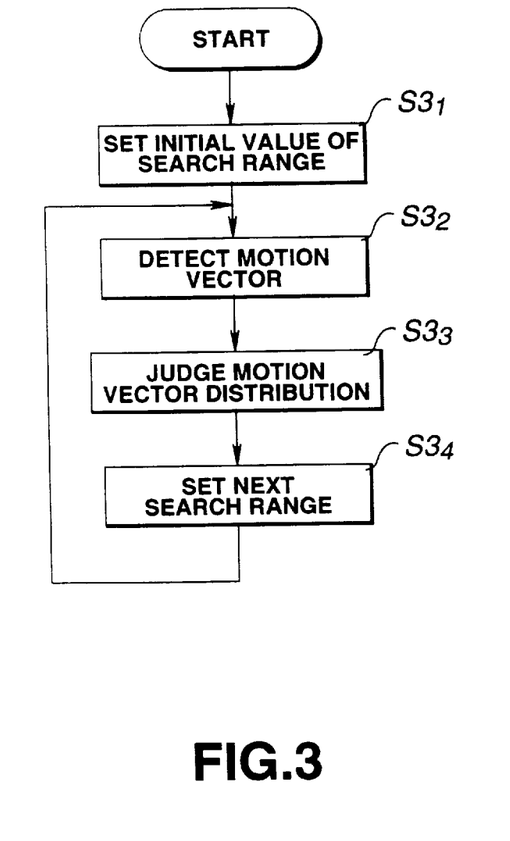
FIG. 3 is a flowchart to which reference will be made in explaining a motion vector detection operation performed by the picture encoding apparatus of FIG. 1.

Motion vector detection processing will now be more fully described with reference to FIG. 3.

Initially, as indicated at step $S3_1$, the search range control circuit 111 sets an initial value of the search range and controls the motion vector detection circuit 11 so that motion vector detection for the first frame is made within the initial value search range. As such, motion vector detection is performed within the initial value search range during the encoding of the P(4) frame.

At step $S3_2$, the motion vector detection circuit 11 detects the motion vectors within the set search range under the control of the search range control circuit 111. Thereafter, processing proceeds to step $S3_3$, wherein the motion vector distribution judgment circuit 12 determines the distribution range of the motion vectors obtained by the motion vector detection circuit 11. Based upon such determined distribution range, the search range control circuit 111 sets the search range for detection of the next motion vector at step $S3_4$. Processing then returns to step $S3_2$.

Figure 4:
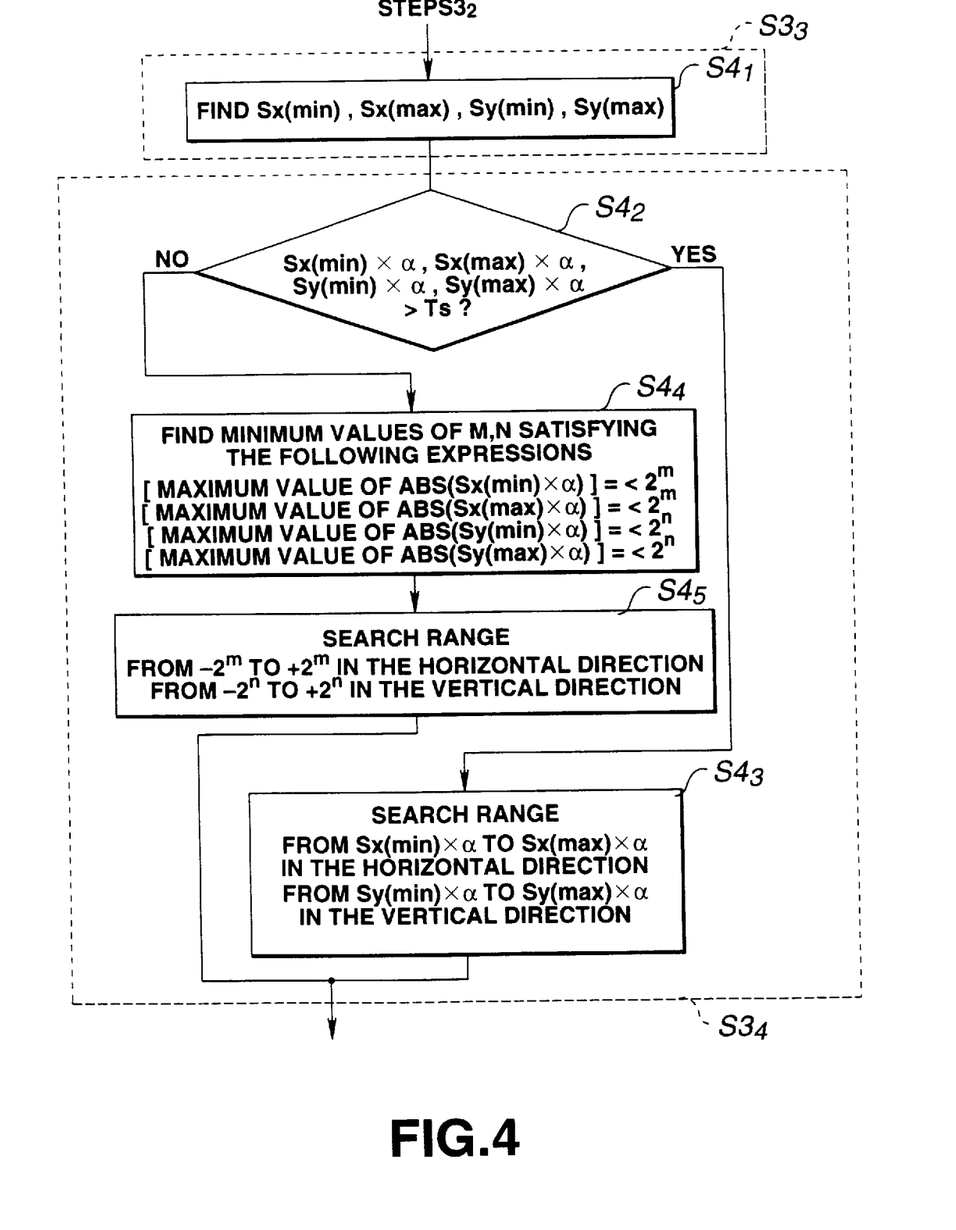
FIG. 4 is a flowchart to which reference will be made in explaining a search range setting operation performed by the picture encoding apparatus of FIG. 1.

The operation of setting the motion vector search range shown in FIG. 3, will be hereinbelow more fully described with reference to FIG. 4. In FIG. 4, step $S4_1$, and steps $S4_2$ to $S4_5$ respectively correspond to step $S3_3$ and step $S3_4$ of FIG. 3.

At step $S4_1$, the motion vector distribution judgment circuit 12 determines the distribution range of the motion vectors obtained by the motion vector detection circuit 11. More specifically, the motion vector distribution judgment circuit 12 determines a maximum value Sx (Sx(max)) and a minimum value −Sx (Sx(min)) in the horizontal direction of the motion vector and a maximum value Sy (Sy(max)) and a minimum value −Sy (Sy(min)) in the vertical direction of the motion vector, as shown in FIG. 2B.

Processing then proceeds to step $S4_2$, wherein the search range control circuit 111 determines whether or not the absolute values obtained by the following expressions 1–4 are larger than a threshold value Ts.

$$Sx(\text{max}) \times \alpha \quad (1)$$

$$Sx(\text{min}) \times \alpha \quad (2)$$

$$Sy(\text{min}) \times \alpha \quad (3)$$

$$Sy(\text{min}) \times \alpha \quad (4)$$

In the expressions 1–4, Sx(max), Sx(min), Sy(max) and Sy(min) represent the above-described values obtained by the motion vector distribution judgment circuit 12 and $\alpha$ denotes a so-called frame distance ratio, that is, the ratio of (search distance of detection of the motion vector now being determined)/(frame distance as found at the time of determining the distribution of the current motion vector). If the absolute values obtained by the expressions (1) to (4) are larger than the threshold value Ts, processing proceeds to step $S4_3$ wherein the search range control circuit 111 sets the search range to Sx(min)×α to Sx(max)×α in the horizontal direction and Sy(min)×α to Sy(max)×α in the vertical direction.

On the other hand, if the determination in step $S4_2$ is negative such that the absolute values obtained by the expressions (1) to (4) are not larger than the threshold value Ts, processing proceeds to steps $S4_4$, and $S4_5$ wherein the search range control circuit 111 sets a different search range from that set in step $S4_3$. More specifically, at step $S4_4$ the minimum values of m, n which satisfy the below expressions (5) to (8) are determined.

$$[\text{maximum value of } ABS(Sx(\text{min}) \times \alpha)] = <2^m \quad (5)$$

$$[\text{maximum value of } ABS(Sx(\text{max}) \times \alpha)] = <2^m \quad (6)$$

$$[\text{maximum value of } ABS(Sy(\text{min}) \times \alpha)] = <2^n \quad (7)$$

$$[\text{maximum value of } ABS(Sy(\text{max}) \times \alpha)] = <2^n \quad (8)$$

At step $S4_5$, the search range is set to $-2^m$ to $+2^m$ and $-2^n$ to $+2^n$ in the horizontal and vertical directions, respectively.

Therefore, as described above, if the absolute values obtained by the expressions (1) to (4) are larger than the threshold value Ts, the search range is not set to the range of $2^m$ to $+2^m$ for the horizontal direction and $-2^n$ to $+^n$ for the vertical directions, but is set to a smaller search range, that is, to the search range of Sx(min)×α to Sx(min)×α for the horizontal direction and Sy(min)×α to Sy(max)×α for the horizontal direction. Thus, a motion vector having values of residual data larger than the threshold value Ts is not likely to be inherent motion and hence eliminated for evaluation. By prohibiting variations in the motion vector values in this manner, motion vector changes may he smoothed so as to reduce the values of the residual data. This may reduce or diminish the amount of the information generated in the encoding of the motion vector.

In the MPEG2 system, data f__ code specifying the above-described search range is transmitted simultaneously so that the original motion vectors may be obtained from the variable length codes upon decoding. Table 2 illustrates an exemplary relation between the search range and the data f__ code.

TABLE 2

| f__ code[s][t] | Vertical components (t==1) of field vectors in frame pictures | All other cases |
|---|---|---|
| 0 | (forbidden) | |
| 1 | −1, +3.5 | −8, +7.5 |
| 2 | −8, +7.5 | −16, +15.5 |
| 3 | −16, +15.5 | −32, +31.5 |
| 4 | −32, +31.5 | −64, +63.5 |
| 5 | −64, +63.5 | −128, +127.5 |
| 6 | −128, +127.5 | −256, +255.5 |
| 7 | −256, +255.5 | −512, +511.5 |
| 8 | −512, +511.5 | −1024, +1023.5 |
| 9 | −1024, +1023.5 | −2048, +2047.5 |
| 10   15 | (reserved) | |

Thus, the P(4) frame is encoded as above described. Subsequently, the B1(2) frame is encoded as described below.

Data of the B1(2) frame is supplied through the input terminal of the picture encoding device 100 to the frame memory 10 and stored therein, and is further supplied to the motion vector encoding circuit 11 as reference frame data. The motion vector detection circuit 11 reads out stored data of the I(1) frame and P(4) frame from the frame memory 10 and utilizes such data as search frames for motion vector detection. More particularly, the motion vector detection circuit 11 detects a motion vector(s) in the I(1) frame with the B1(2) frame as a reference, while detecting a motion vector(s) in the P(4) frame with the B1(2) frame as a reference within a search range set under control of the search range control circuit 111 as more fully described below.

Figure 5A:
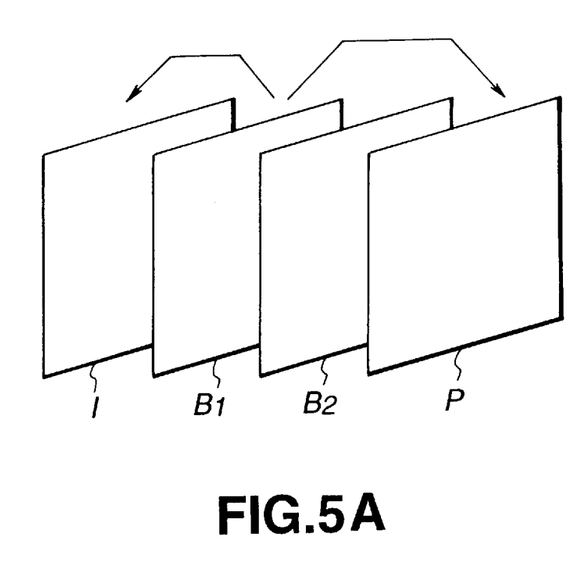
FIGS. 5A, 5B and 5C are diagrams to which reference will be made in explaining the operation of the picture encoding apparatus of FIG. 1.
Figure 5B:
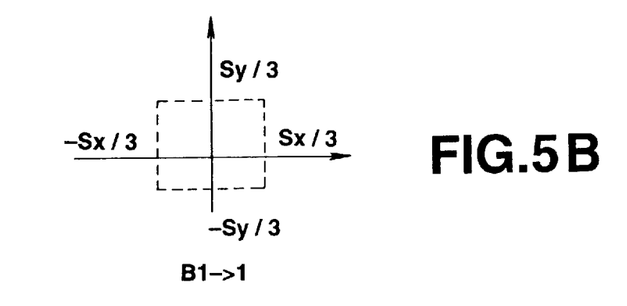
Figure 5C:
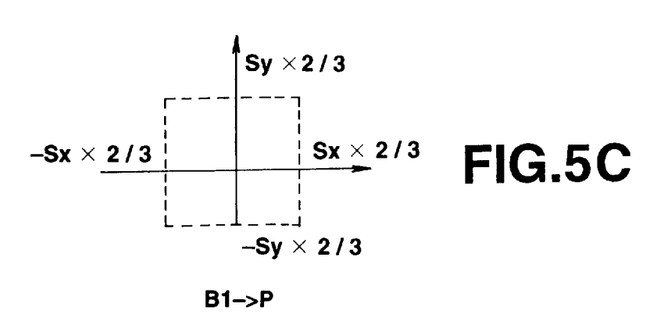

The relation or distance between the reference B1(2) frame and search frames I(1) and P(4) is shown in FIG. 5A. Since the frame distance between the B1(2) frame and the I(1) frame is one frame, as shown in FIG. 5A, the motion vector search range of the I(1) frame with the B1(2) frame as the reference may be one-third of the motion vector search range for encoding the P(4) frame previously described if the motion is smooth. As a result, the search range control circuit 111 controls the motion vector detection circuit 11 such that, if the motion vector search range for encoding the P(4) frame is −Sx to +Sx in the horizontal direction and −Sy to +Sy in the vertical direction, the current search range is set to −Sx/3 to +Sx/3 in the horizontal direction and −Sy/3 to +Sy/3 in the vertical direction as shown in FIG. 5B. Accordingly, motion vectors may be detected within this search range. On the other hand, since the frame distance between the B1(2) frame and the P(4) frame is two frames, as shown in FIG. 5A, the search range control circuit 111 causes the motion vector search range of the P(4) frame having the B1(2) frame as a reference to be set to −2Sx/3 to +2Sx/3 in the horizontal direction and −2Sy/3 to +2Sy/3 in the vertical direction as shown in FIG. 5C, whereupon motion vectors may be detected within this search range.

The remaining operations for the encoding of the B1(2) frame are subtantially similar to those for encoding the P(4) frame previously described and, in the interest of brevity, a further description thereof is omitted herein.

Figure 6:
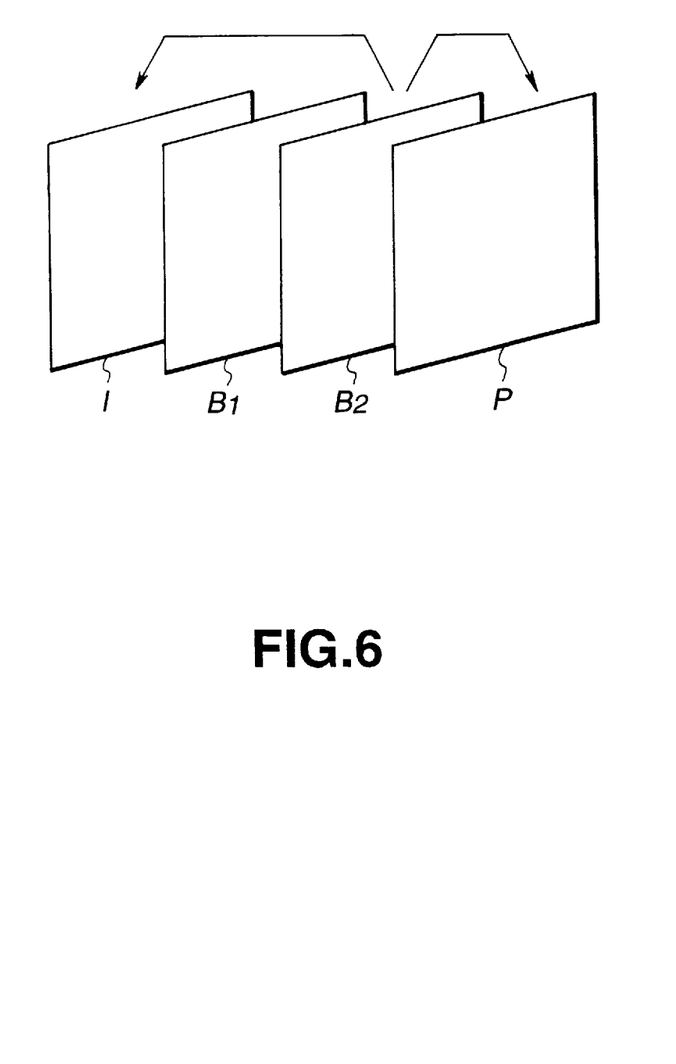
FIG. 6 is a diagram to which reference will be made in explaining the operation of the picture encoding apparatus of FIG. 1.

After encoding the B1(2) frame, the B2(3) frame is encoded. Such encoding of the B2(3) frame is similar to the encoding of the B1(2) frame described above. However, since the frame distance between the B2(3) frame and the P(4) frame is one frame, as shown in FIG. 6, the motion vector search range of the P(4) frame having the B2(3) frame as a reference is set to −Sx/3 to +Sx/3 in the horizontal direction and −Sy/3 to +Sy/3 in the vertical direction. Additionally, since the frame distance between the B2(3) frame and the I(1) frame is two frames, the motion vector search range of the I(1) frame having the B2(3) frame as a reference is set to −2Sx/3 to +2Sx/3 in the horizontal direction and −2Sy/3 to +2Sy/3 in the vertical direction.

By setting the motion vector search range(s) as described above, codes having short lengths may be assigned to a detected motion vector during variable length encoding. Additionally, codes having short lengths may be assigned to difference data and smooth motion vector distribution may be achieved for the differences of the motion vectors of respective blocks for variable length encoding of the resulting difference data. As a result, the amount of information generated during encoding may be reduced.

Alternatively, the following procedure may be used for setting a motion vector search range.

The motion vector search range of the I(1) frame with the B1(2) frame as a reference is determined. Suppose such search range is −Sxa to +Sxa in the horizontal direction and −Sya to +Sya in the vertical direction. Then, since the frame distance between the B2(3) frame and the I(1) frame is twice as large as the frame distance between the frame B1(2) and the frame I(1), the motion vector search range in the I(1) frame with the B2(3) frame as a reference is −2Sxa to +2Sxa in the horizontal direction and −2Sya to +2Sya in the vertical direction. Similarly, suppose the motion vector search range in the P(4) frame with the B1(2) frame as a reference is −Sxb to +Sxb in the horizontal direction and −Syb to +Syb in the vertical direction. Then, since the frame distance between the B2(3) frame and the P(4) frame is one-half the frame distance between the frame B1(2) and the frame P(4), the motion vector search range in the P(4) frame with the B2(3) frame as reference is −Sxb/2 to +Sxb/2 in the horizontal direction and −Syb/2 to +Syb/2 in the vertical direction.

In the above-described picture encoding apparatus, the search range is set or limited for detecting motion vectors. However, as herinafter more fully described, the search range for detecting motion vectors may be changed.

Assume that a motion vector search range with a one frame interval distance is set to −Sx to +Sx in the horizontal direction and −Sy to +Sy in the verticle direction, and that frames I(0), B(1), B(2) and P(3) are encoded in a time sequence, that is, in the order of I(0), B(1), B(2) and P(3). As such, the motion vector search range, utilized for detecting a motion vector, in the I(0) frame with the B(1) frame as a reference is set to −Sx to +Sx in the horizontal direction and −Sy to +Sy in the vertical direction. Since the frame distance between the B(2) frame and the I(0) frame is two frames, the motion vector search range in the I(0) frame with the B(2) frame as a reference is −2Sx to +2Sx in the horizontal direction and −2Sy to +2Sy in the verticle direction. If the motion vector distribution range is −Ax to +Bx in the horizontal direction and −Ay to +By in the verticle direction, the motion vector search range in the I(0) frame with the B(2) frame as a reference is set to −(Ax+Sx) to +(Bx+Sx) in the horizontal direction and −(Ay+Sy)+(By+Sy) in the vertical direction.

When there is little or no motion from the B(1) frame to the I(0) frame, the motion vector distribution range may be concentrated substantially at (0, 0) such that the values of Ax, Bx, Ay and By become substantially equal to zero. In such situation, the motion vector search range for the I(0) frame with the B(1) frame as a reference is set to −Sx to +Sx in the horizontal direction and −Sy to +Sy in the vertical direction similar to the motion vector search range for a one-frame interval.

On the other hand, consider the situation wherein there is substantial motion from the B(1) frame to the I(0) frame, whereupon the motion vector distribution range may be similar to that of the search range for one frame interval (that is, −Sx to +Sx in the vertical direction and −Sy to +Sy in the horizontal direction). In this situation, the search range of the motion vector for the I(0) frame with the B(1) frame as a reference may be set to −2Sx to +2Sx in the horizontal direction and −2Sy to +2Sy in the vertical direction. (In determining these ranges, the relationships Ax=Sx, Bx=Sx, Ay=Sy and By=Sy may be utilized.) Further, this range may represent the maximum search range.

By adaptively varying the search range as described above, motion vectors may be detected while reducing or minimizing the number of searches. As a result, the amount of information generated for the encoding involving such motion vectors may be reduced.

Figure 7:
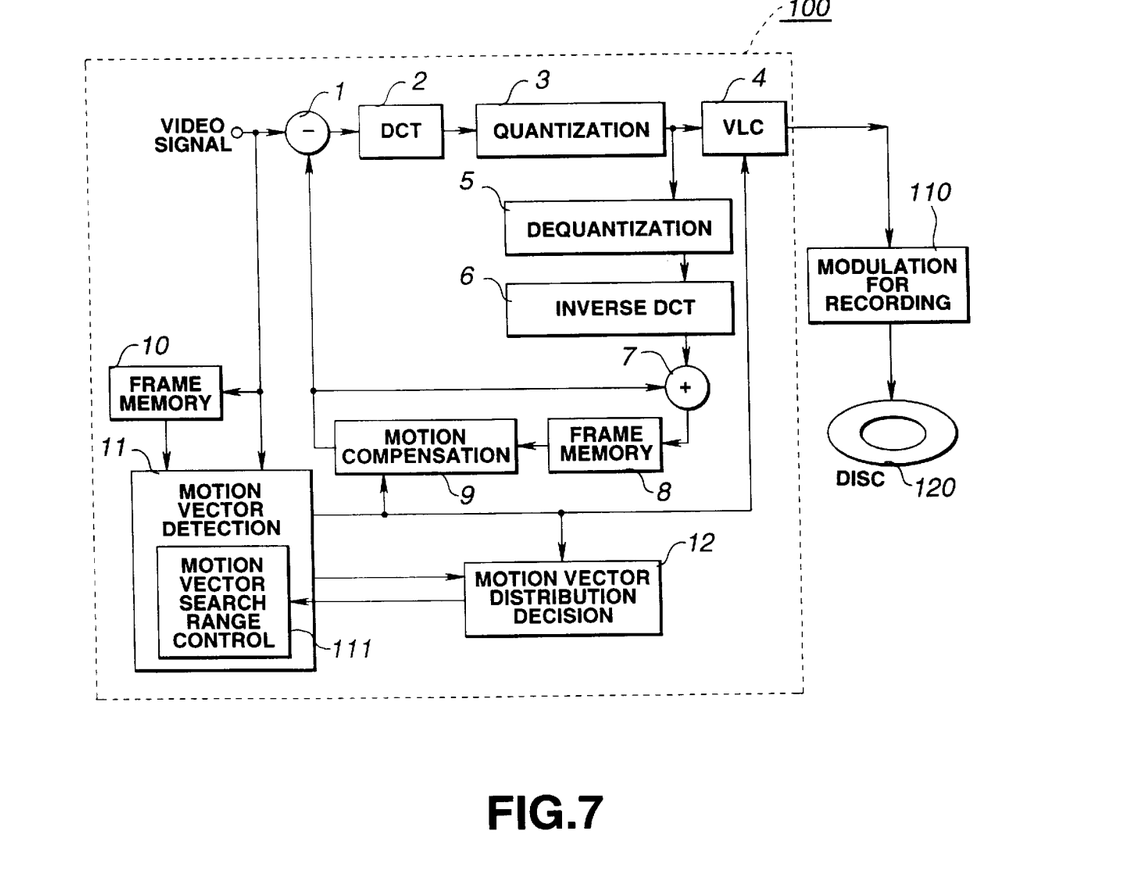
FIG. 7 is a diagram of an apparatus for recording encoded picture data onto a disc medium according to another embodiment of the present invention.

An apparatus for recording encoded picture data according to the present invention will now be described with reference to FIG. 7. As shown therein, such recording apparatus generally includes the picture encoding apparatus 100, a recording modulation circuit 110 and a recording or disc medium 120. The picture encoding apparatus 100 is substantially identical to that described with reference to FIG. 1 and, as such, will not be further described herein.

In the present recording apparatus, an output signal or encoded data from the picture encoding apparatus 100 is supplied to the recording modulation circuit 110 wherein the signal is modulated in accordance with a predetermined technique and recorded onto the disc 120. Accordingly, the encoded picture data recorded onto the disc medium may include a reduced amount of motion vector encoding information. As a result of such recording, a relatively high quality picture may be produced upon the reproduction thereof.

Therefore, in the present picture encoding apparatus, a motion vector or vectors are detected and a distribution range of the detected motion vector(s) is determined. Based upon such distribution range, a motion vector search range is predicted and set. The next motion vector is detected within the set search range. As a result, codes having shorter lengths may be assigned during variable length encoding involving the detected motion vector(s). Further, when determining the difference of the motion vectors of respective blocks and variable length encoding the difference data, codes having shorter lengths may be assigned to the difference data to assure a smooth motion vector distribution. As a result, the amount of the information generated during encoding may be reduced.

Further, the motion vector distribution may be updated whenever a search is performed between any two I, P and B pictures. Alternatively, such update may be performed only when a search is conducted between certain ones of the I, P and B pictures, such as between an I and P pictures.

Furthermore, in a frame sequence I1, B1, B2, P1, B3, B4, P2, B5, B6, P3, B7, B8, P3, . . . , the motion vector distribution may be determined between predetermined arrangements of pairs of such frames. For example, such distribution may be determined between the following arrangement of pairs: (I1, P1), (P1, P2), (P2,P3), (P3,P4) . . . Alternatively, the arrangement (I1,B1), (B1,B2), (B2,P1), (P1,B3) . . . may be used.

Additionally, the present recording apparatus enables picture data encoded in accordance with the present encoding technique to be recorded onto a recording disc or medium. Upon reproducing such recorded picture data, a picture having relatively high quality may be produced.

Although the video data signal used in the present encoding apparatus was described as representing video frames, the present invention is not so limited. That is, video data signals representing other arrangements of video data/ images such as video fields and the like may also be used. Similarly, the present encoding apparatus is not limited to using pixel blocks having a 16×16 block size as described above, but instead other block sizes may be utilized.

Further, the present encoding apparatus is not limited to use with a MPEG2 system and the specific I, P and B picture sequence described above. That is, the present encoding apparatus may be operated in accordance with other types of encoding techniques, such as MPEG, and with other I, P and B picture sequences (which may have different frame distances therebetween).

Furthermore, although certain size search ranges and criteria for determining the same was described above, the present encoding apparatus is not so limited. That is, other size search ranges and criteria may be utilized.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. A picture encoding method for detecting a motion vector of input video signals representing one frame by utilizing video signals of a previous frame, motion-compensating the video signals of the previous frame based upon the detected motion vector and encoding the motion-compensated video signals, said method comprising the steps of:

detecting a distribution range of the motion vector of the one-frame input video signals;

determining a size of an entire range from which the motion vector is searched based upon the detected distribution range and setting the search range; and detecting the motion vector of the input video signals within the set search range.

2. A picture encoding apparatus having motion vector detection means for detecting a motion vector of input video signals representing one frame by utilizing video signals of a previous frame, motion-compensating the video signals of the previous frame based upon the detected motion vector obtained by the motion vector detection means and encoding the motion-compensated video signals, said apparatus comprising:

distribution detection means for detecting a distribution range of the motion vector obtained by said motion vector detection means; and control means for controlling a size of an entire range from which the motion vector obtained by said motion vector detection means is searched based upon the motion vector distribution range from said distribution detection means, said control means determining the search range for the motion vectors of the video signals in said motion vector detection means and setting the search range of the motion vector in said motion vector detection means;

said motion vector detection means detecting the motion vector of the input video signals within the search range set by said control means.

3. A recording apparatus for recording encoded video data on a recording medium, in which a motion vector of input video signals representing one frame is detected utilizing video signals of a previous frame and the video signals of the previous frame are motion-compensated based upon the detected motion vector and encoded so as to form the encoded video data, said apparatus comprising;

motion vector detection means for detecting said motion vector;

distribution detection means for detecting a distribution range of the motion vector or vectors obtained by said motion vector detection means; and control means for controlling a size of an entire range from which the motion vector or vectors obtained by said motion vector detection means are searched based upon the motion vector distribution range from said distribution detection means, said control means determining the search range of the motion vector of the video signals in said motion vector detection means and setting the motion vector search range for said motion vector detection means;

said motion vector detection means detecting the motion vector of the input video signals within the search range set by said control means.

4. An apparatus for encoding video signals representing a plurality of pictures, said apparatus comprising:

motion vector detection means for detecting a motion vector of input video signals from within an overall search range;

means for determining a distribution range of at least one motion vector previously detected by said motion vector detection means and for determining a size of said overall search range in accordance with said distribution range; and means for encoding the input video signals based upon the detected motion vectors.

5. A processing apparatus comprising:

means for receiving encoded video data representing a plurality of video frames or pictures;

means for setting an initial search range;

means for detecting a first motion vector from within said initial search range;

means for determining a distribution range of the first detected motion vector and for determining a size of a subsequent overall search range in accordance with said distribution range; and means for detecting a second motion vector from within said subsequent overall search range.

6. The processing apparatus according to claim 5, wherein the received encoded video data represents a plurality of intra-coded (I), inter-frame coded predictively coded (P) and bi-directionally predictive coded (B) video frames or pictures.

7. The processing apparatus according to claim 6, wherein the received video data is encoded in accordance with a MPEG2 technique.

8. The processing apparatus according to claim 6, wherein the received encoded video data represents a predetermined sequence of I, P and B video frames or pictures and wherein said predetermined sequence is I, P, B, B, P, B, B and P.

9. The processing apparatus according to claim 6, further comprising means for variable length encoding the received video data in accordance with the detected motion vectors.

10. The processing apparatus according to claim 9, further comprising means for recording the variable length encoded video data onto a recording medium.

11. A processing method comprising the steps of:

receiving encoded video data representing a plurality of video frames or pictures;

setting an initial search range;

detecting a first motion vector from within said initial search range;

determining a distribution range of the first detected motion vector and determining a size of a subsequent overall search range in accordance with said distribution range; and detecting a second motion vector from within said subsequent overall search range.

12. The processing method according to claim 11, wherein the received encoded video data represents a plurality of intra-coded (I), inter-frame coded predictively coded (P) and bi-directionally predictive coded (B) video frames or pictures.

13. The processing method according to claim 12, wherein the received video data is encoded in accordance with a MPEG2 technique.

14. The processing method according to claim 12, wherein the received encoded video data represents a predetermined sequence of I, P and B video frames or pictures and wherein said predetermined sequence is I, P, B, B, P, B, B and P.

15. The processing method according to claim 12, further comprising the step of variable length encoding the received video data in accordance with the detected motion vectors.

16. The processing method according to claim 15, further comprising the step of recording the vaiable length encoded video data onto a recording medium.

17. An apparatus for processing video data representing a plurality of intra-coded (I), inter-frame coded predictively coded (P) and bi-directionally predictive coded (B) video frames or pictures arranged in a predetermined sequence so as to have respective frame distances therebetween, said apparatus comprising:

means for determining a first search range;

means for detecting a first motion vector from within said first search range, said first motion vector representing motion between two of the video frames;

means for detecting a second motion vector from within a second search range, said second motion vector representing motion between another two of the video frames;

means for determining a size of said second search range in accordance with said first search range and a relationship of the distance between the two video frames associated with said first motion vector and the distance between the other two video frames associated with said second motion vector; and means for variable length encoding the video data in accordance with the detected motion vectors.

18. The apparatus for processing video data according to claim 17, wherein said means for determining a first search range includes means for determining a distribution range of a motion vector detected prior to said first motion vector and means for determining said first search range in accordance with said distribution range.

19. A method for processing video data representing a plurality of intra-coded (I), inter-frame coded predictively coded (P) and bi-directionally predictive coded (B) video frames or pictures arranged in a predetermined sequence so as to have respective frame distances therebetween, said method comprising the steps of:

determining a first search range;

detecting a first motion vector from within said first search range, said first motion vector representing motion between two of the video frames;

detecting a second motion vector from within a second search range, said second motion vector representing motion between another two of the video frames;

determining a size of said second search range in accordance with said first search range and a relationship of the distance between the two video frames associated with said first motion vector and the distance between the other two video frames associated with said second motion vector; and variable length encoding the video data in accordance with the detected motion vectors.

20. The method for processing video data according to claim 19, wherein the step of determining a first search range includes determining a distribution range of a motion vector detected prior to the first motion vector and determining said first search range in accordance with said distribution range.

* * * * *